United States Patent
Sharp et al.

(10) Patent No.: US 8,245,153 B2
(45) Date of Patent: Aug. 14, 2012

(54) SYSTEM AND METHOD FOR DISPLAYING GANTT CHARTS WITH OTHER PROJECT MANAGEMENT TOOLS

(75) Inventors: Nicholas Sharp, Toronto (CA); Jason Enzi, Osbawa (CA); Elefterios Fountoulakis, Vaughan (CA); Baron Lam, Toronto (CA); Michael Christopher Rabbior, Richmond Hill (CA)

(73) Assignee: International Business Machines Coporation, Armonk, NY (US)

( * ) Notice: Subject to any disclaimer, the term of this patent is extended or adjusted under 35 U.S.C. 154(b) by 751 days.

(21) Appl. No.: 12/018,964

(22) Filed: Jan. 24, 2008

(65) Prior Publication Data

US 2009/0193353 A1    Jul. 30, 2009

(51) Int. Cl.
*G06F 3/048* (2006.01)
(52) U.S. Cl. .......................... 715/786; 715/787
(58) Field of Classification Search .......... 715/785–786, 715/787; 345/440; 382/168
See application file for complete search history.

(56) References Cited

U.S. PATENT DOCUMENTS

| | | | | |
|---|---|---|---|---|
| 5,414,809 | A * | 5/1995 | Hogan et al. | 715/765 |
| 5,491,781 | A * | 2/1996 | Gasperina | 715/786 |
| 5,526,018 | A * | 6/1996 | Fisher | 345/668 |
| 6,380,953 | B1 * | 4/2002 | Mizuno | 715/764 |
| 7,050,056 | B2 * | 5/2006 | Meyringer | 345/440 |
| 7,505,998 | B2 * | 3/2009 | Barrett | 1/1 |
| 2003/0074391 | A1 * | 4/2003 | Carter et al. | 709/200 |
| 2005/0160084 | A1 | 7/2005 | Barrett | |
| 2006/0200372 | A1 * | 9/2006 | O'Cull et al. | 705/8 |
| 2006/0238538 | A1 * | 10/2006 | Kapler et al. | 345/440 |
| 2007/0203816 | A1 * | 8/2007 | Costache et al. | 705/35 |

OTHER PUBLICATIONS

Reenskaug, Trygve, "Models-View-Controllers," Dec. 10, 1979.*
Woerner, Irene Wong. et al., Hypertext-based Design of a User Interface for Scheduling, Jet Propulsion Laboratory, California Institute of Technology, Sep. 1993. http://hdl.handle.net/2014/35830. Retrieved from the internet on Mar. 16, 2011.*
IEEE Std 100, published 2000. pp. 703-704. Definition of "module".*

* cited by examiner

*Primary Examiner* — Doon Chow
*Assistant Examiner* — Wilson Varga
(74) *Attorney, Agent, or Firm* — Novak Druce + Quigg LLP

(57) ABSTRACT

A graphical user interface for a Gantt chart map display (100) includes a list of projects (214), a corresponding activity timeline reflecting activity for each project, and a control (210) at a side or bottom area of the Gantt chart map display for manipulating date ranges viewable in the viewable area. The GUI further includes a selected date range control (204) providing a high level view (202) of the corresponding activity timeline displayed in the viewable area (212) above and can provide a high level view of corresponding activity beyond the scrollable view. A dynamic set of controls (205 and 206) enables preset filtered views of the Gantt chart with preset time frames such as days, weeks, months and years or predetermined date ranges entered by a user. The preset filtered view can also automatically re-sort and scale content on the Gantt chart into a viewable area to reduce scrolling.

12 Claims, 3 Drawing Sheets

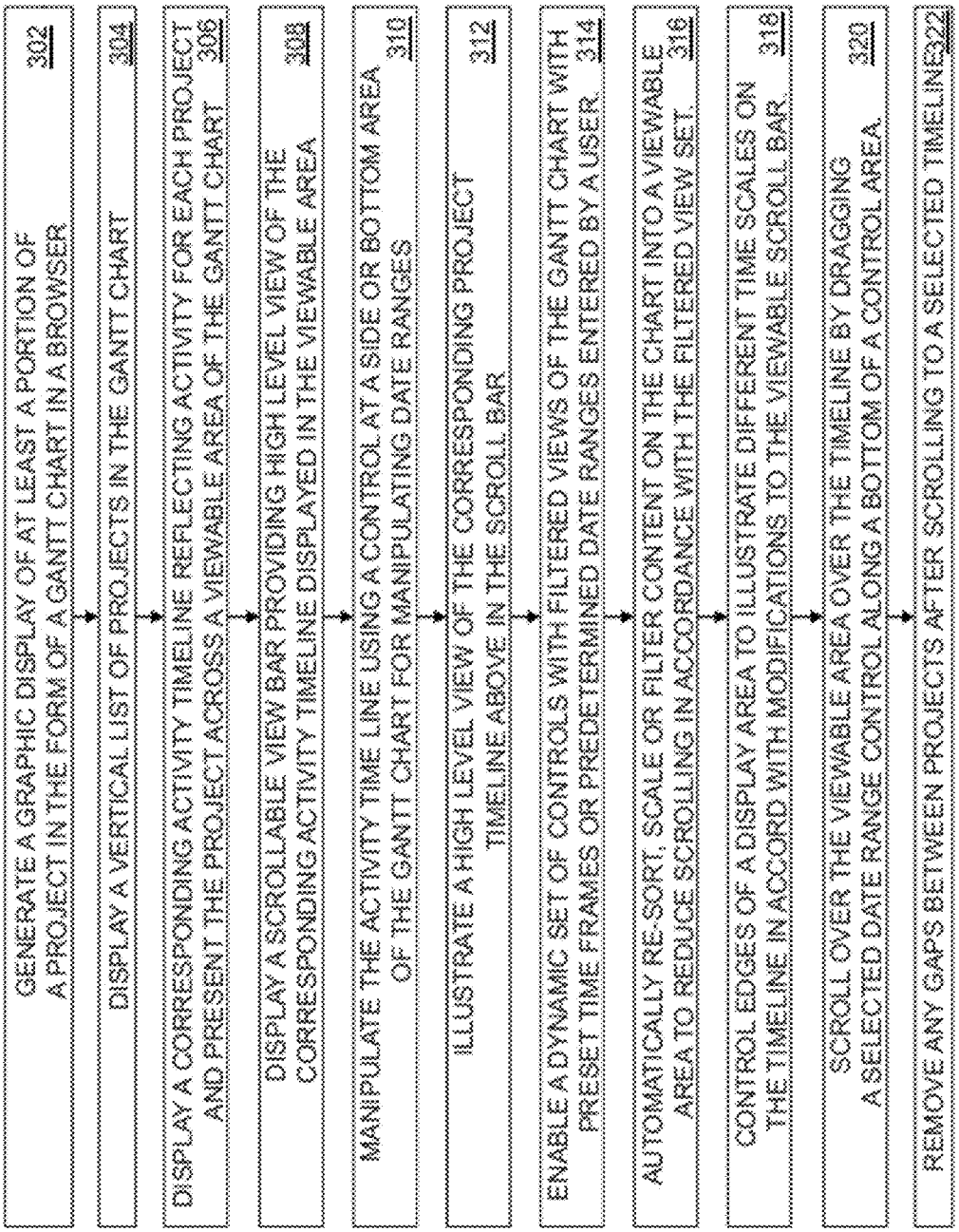

SYSTEM AND METHOD FOR DISPLAYING GANTT CHARTS WITH OTHER PROJECT MANAGEMENT TOOLS

FIELD OF THE INVENTION

The present invention relates to the fields of scheduling and user interfaces and, more particularly, to a Gantt chart map display used for process or project development.

BACKGROUND

Project development systems allow a user to develop and manage a project, among other things. Such systems can support various types of projects, including marketing projects, design projects, manufacturing projects, consulting projects, development projects, and any combination thereof. Project development systems can include project development applications that run on computing devices used for managing one or more projects.

Project development systems often use a project structure to describe a given project. In general, a project structure maps real-world aspects of a project, such as timelines and tasks, into an electronically accessible format. For example, many project development systems describe a start, finish, and other schedule dates of a project, the tasks that are performed and the results that are achieved during the project, and the data objects that are generated by the project or used to complete the project.

A Gantt chart is an example of a project structure that can be used to describe a given project. A Gantt chart is a graphical representation that shows the time dependency of several tasks of a project within a calendar. A Gantt chart provides a graphical illustration of a schedule that helps to plan, coordinate, and track specific tasks in a project.

In particular, a Gantt chart displays a bar chart that illustrates a project schedule. Gantt charts illustrate the start and finish dates of the terminal elements and summary of a project. Typically the charts begin in an upper left "X" and "Y" starting coordinate where each graph element takes up space by a horizontal bar rule. Although a Gantt chart is easily comprehended for small projects that fit on a single sheet or screen, they can become unwieldy for projects with more than about thirty activities. Larger Gantt charts may not be suitable for most computer displays due to excessive horizontal and vertical scrolling. A typical Gantt chart can include a calendar constructed with a horizontal axis and a vertical axis. The horizontal axis represents the total time span of the project. The time span of the project can be broken down into divisions (or increments), e.g., days, weeks, or months. The vertical axis represents the tasks associated with the project. Horizontal bars of varying lengths represent the sequences, timing, and duration for each task. A table (or hierarchy diagram) can be displayed next to the Gantt chart that contains additional information about the tasks. A new approach for implementing Gantt charts is needed in view of the increased complexity of projects.

SUMMARY OF THE INVENTION

Adding a new tool herein called the "Gantt chart map display" to a typical Gantt chart, enables a high-level view of all running projects to be automatically narrowed down and sorts projects for a particular date range into view. The Gantt chart map display provides a unique and innovative visual means to easily control, see and manage all projects running in a Gantt chart. Introducing a high level "Gantt Chart Map Display" tool in addition to a Gantt chart can provide a complete view of running projects for that day and over the year or a particular time span. There is no fixed starting "X" and "Y" coordinate to begin displaying bar rules but rather a more efficient "view" filter can be used instead. A dynamic set of controls allows the Gantt chart "view" of running projects to be filtered by different days, weeks, months or years or by user selectable entries of date ranges. The "view" filter can also automatically re-sort and scale content into a viewable area reducing the amount of scrolling and thereby improving search and workflow. Details of projects can be displayed in a corresponding form view below the Gantt chart. A Gantt chart as described above greatly enhances the ability to navigate, manage and view a greater expanse of the Gantt chart.

The embodiments of the present invention can be implemented in accordance with numerous aspects consistent with material presented herein. For example, one aspect of the present invention can include a graphical user interface (GUI) for a Gantt chart map display including a vertical list of projects, a corresponding activity timeline reflecting activity for each project in the vertical list of projects and presented horizontally across a viewable area, and a control at a side area of the Gantt chart map display for manipulating date ranges viewable in the viewable area. The GUI can further include a selected date range control in the form of a scalable, scrollable filtering view bar providing a high level view of the corresponding activity timeline displayed in the viewable area above at a bottom area corresponding to the side area for the control. The selected date range control can also provide a high level view of corresponding activity beyond the scrollable view. The selected date range control is only one form of control since the "control" herein can also provide a dynamic set of controls enabling preset filtered views of the Gantt chart by preset time frames such as days, weeks, months and years. The dynamic set of controls can also enable entry of a predetermined date range by a user. The preset filtered view can also automatically re-sort and scale content on the Gantt chart into a viewable area to reduce scrolling. The edges of a display area are controlled to illustrate different time scales on the time line. The selected date range control can be stretched horizontally to illustrate the different time scales on the time line. A function of scrolling over the viewable area over the time line can also be done by dragging the selected date range control along a bottom of a control area. After scrolling (or stretching the scroll bar) to a selected timeline, the Gantt chart can automatically re-sort, rescale, or filter projects in and out enabling the view of projects running during the selected time line and removing any gaps or vertical white spaces between projects.

It should be noted that various aspects of the invention can be implemented as a program or a computer implemented method for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

FIG. 3 is a flow chart illustrating a method in accordance with an embodiment of the present invention.

DETAILED DESCRIPTION

Figure 1:
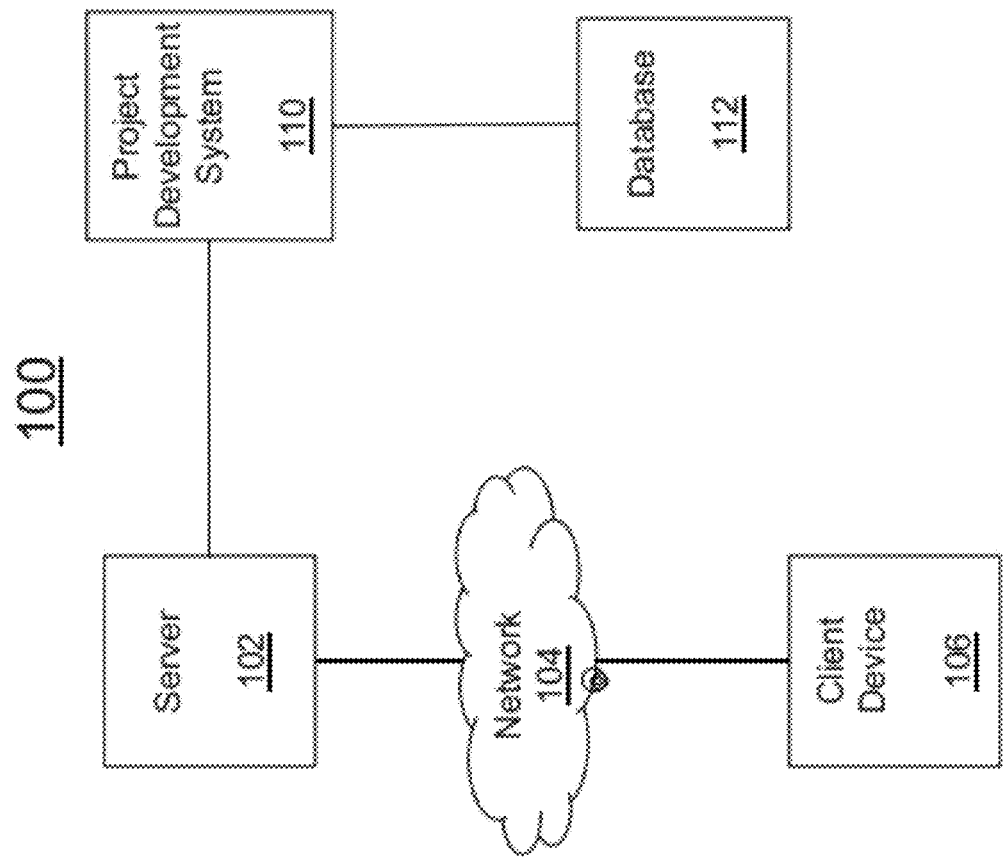
FIG. 1 is a block diagram of a system that can utilize a Gantt chart in accordance with an embodiment of the present invention.

Referring to FIG. 1, a block diagram of a system 100 suitable for dynamically and graphically representing a project in a Gantt chart or a Gantt chart display map is shown. In one implementation, system 100 can include a server such as an application server or web server 102 that can be connected to a network 104. In one implementation, network 104 includes a worldwide collection of networks and connection devices using various protocols to communicate with one another (e.g., the Internet). These protocols may include the Lightweight Directory Access Protocol (LDAP), the Transport Control Protocol/Internet Protocol (TCP/IP) suite of protocols, the Hypertext Transport Protocol (HTTP), the Wireless Application Protocol (WAP), and other suitable communication protocols.

System 100 can communicate with a client device 106 running a client application. In one implementation, the client application can be a browser application capable of displaying Web pages retrieved from server 102 using standardized Web page addressing formats. Thus, the browser can display various types of content in addition to Web pages. Moreover, the location of the content may be represented with a variety of addresses, such as Uniform Resource Locators (URLs) and Uniform Resource Identifiers (URIs). The server 102 can host a project development system 110 and a database system 112. The database system 112 can store a collection of objects or other data that describe a project. The project development system 110 can be an application that stores and executes a project development application. The client (e.g., browser) 106 can communicate with the server 102 during execution of a project development application. For example, the browser can receive information and instructions for dynamically and graphically representing a project in a Gantt chart map display on a display device.

Figure 2:
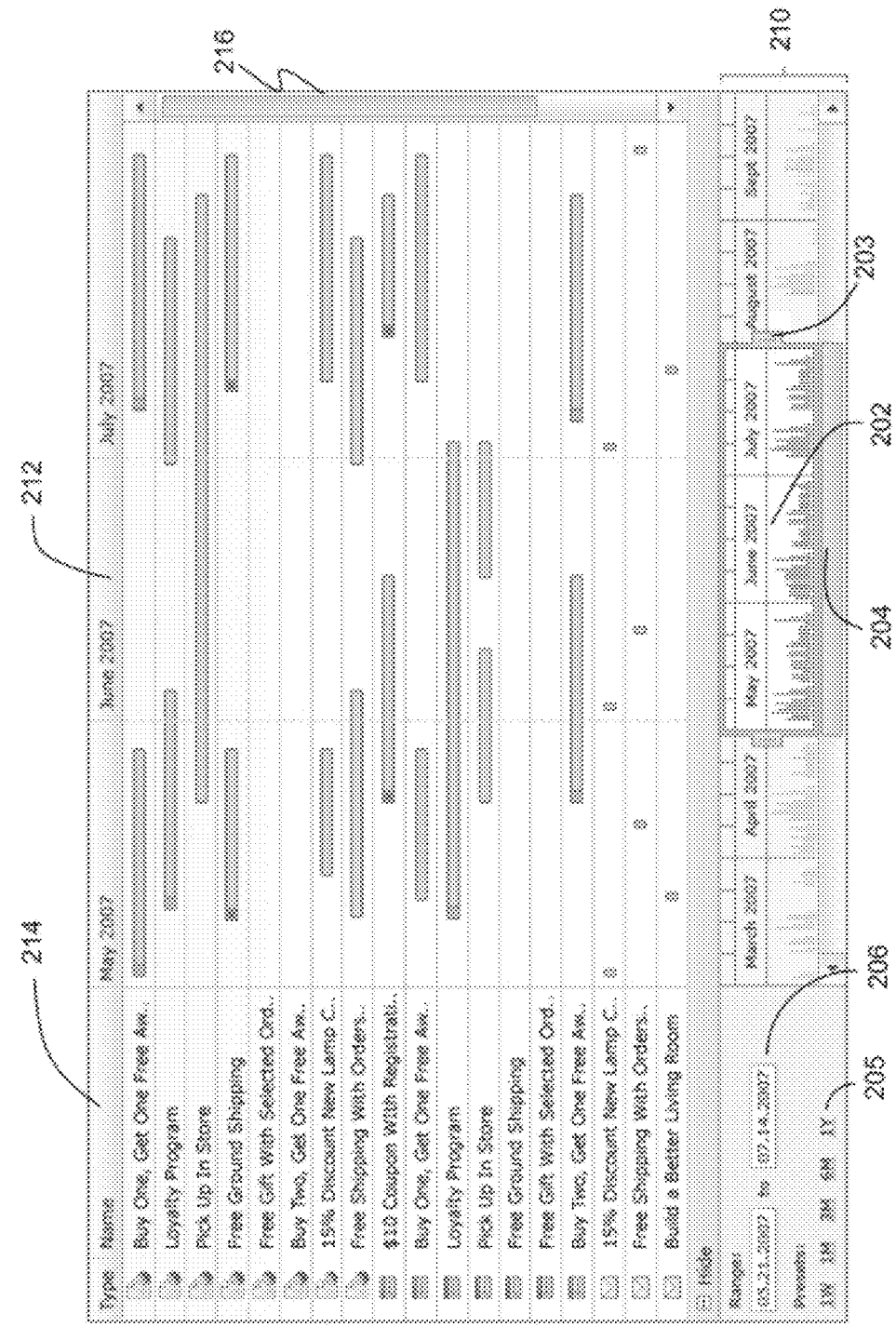
FIG. 2 is an illustration of a Gantt chart map display in accordance with an embodiment of the present invention.

Referring to FIG. 2, a Gantt chart map display or display tool 200 is illustrated in accordance with an embodiment of the present invention. A control or control area 210 at the bottom of the Gantt chart represents a viewable area 212 above at a high-level including what is beyond the scrollable view. The display area has a bar graph 214 which displays the number of projects at any time and a complete list of running projects horizontally on a timeline. The Gantt chart map display can also include a vertical scroll bar 216 to enable the view of a remaining list of projects that might be unseen due to limited computer resolution or a large project listing for example. The edges of the display area can be controlled to show a different scale in the timeline, for example, by stretched the horizontal edges 203 of a selected date range control 204. The selected date range control 204 can also include a high level view vertical bar graph 202 that can display or represent the total number of projects running for the given time frame. The high level view vertical bars of the bar graph 202 represent all the projects scheduled at a given time. As a result, the bar graph 202 provides a good high-level view of the data to see how many projects exist without needing to scroll down. Scrolling the display view over a timeline is done by dragging the selected date range control 204 along the bottom. A user can also click on or otherwise select preset buttons 205 for weeks, months or years (or other preset time frames) to have the Gantt chart zoom-in on that area corresponding to the preset time frames. A specific date range can also be typed into a field 206 to control the display. Selection on the timeline itself in the Month area (e.g., June 2007) will also zoom into that selected area. After a selection is made, the Gantt chart can automatically re-sort into view the projects running in that day from top to bottom removing any unnecessary gaps between projects.

Referring to FIG. 3, a flow chart illustrating a method 300 of representing a project timeline is shown. The method 300 can include the step 302 of generating a graphic display of at least a portion of a project in the form of a Gantt chart in a browser. The method can further display a vertical list of projects in the Gantt chart at step 304 and display a corresponding project timeline at step 306 reflecting activity for each project in the vertical list of projects and presenting the project horizontally across a viewable area of the Gantt chart. At step 308, the method can display a scrollable view bar or a selected date range control providing a high level view of the corresponding activity timeline displayed in the viewable area. The method can also manipulate the activity time line using a control at a side or a bottom area of the Gantt chart for manipulating date ranges viewable in the viewable area at step 310. At step 312, the method can illustrate a high level view of the corresponding activity timeline above in the scroll bar with a high level view. The method can further enable a dynamic set of controls with filtered views of the Gantt chart providing preset time frames including days, weeks, months and years or predetermined date ranges entered by a user at step 314. At step 316, the method can automatically re-sort, scale and filter in and out content on the Gantt chart into a viewable area to reduce scrolling in accordance with the filtered view that is set. The edges of the display or viewable area can be controlled at step 318 to illustrate different time scales on the timeline in accordance with modifications to the selected date range control. The method 300 can also scroll over the viewable area over the timeline by dragging a selected date range control along a bottom of a control area at step 320. After scrolling to a selected timeline, the Gantt chart can automatically re-sort (scale or filter) and enable the view of projects running during the selected timeline and remove any unnecessary gaps between projects at step 322.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A computer-implemented method for representing a timeline for a plurality of projects, the method comprising:
   generating a graphic display in the form of a Gantt chart in a browser, the generating comprising:
      displaying a vertical list of projects in the Gantt chart, the projects in the vertical list comprising at least a portion of the plurality of projects running during a first time range, and
      displaying at least one activity timeline reflecting activity for each of the projects in the vertical list of projects during the first time range and presenting the at least one activity timeline horizontally across a viewable area of the Gantt chart;
   displaying a control area in the browser providing a graph showing a high level view of activity associated with the plurality of projects during a second time range greater than the first time range, the graph showing the high level view of activity plotting a number of the plurality of projects running as a function of time;
   providing at least one date range control in the control area in the form of a scrollable view bar overlapping the graph, the scrollable view bar having manipulable edges and a view window configured for visually indicating a portion of the high level view of activity in the graph associated with the first time range; and
   responsive to manipulating at least one of the manipulable edges of scrollable view bar, adjusting the first time range and repeating the generating and displaying based on the adjusted first time range.

2. The method of claim 1, wherein the method further comprises the step of enabling a dynamic set of controls with filtered views of the Gantt chart providing preset time frames including days, weeks, months and years or predetermined date ranges entered by a user.

3. The method of claim 2, wherein the method further automatically re-sorts and scales content on the Gantt chart into the viewable area to reduce scrolling in accordance with the filtered view that is set.

4. The method of claim 1, wherein the adjusting comprises at least one of controlling and stretching the edges of the graphic display to illustrate different time scales on the at least one activity timeline in accordance with the manipulating of at least one of the manipulable edges of the scrollable view bar.

5. The method of claim 1, wherein the method further comprises adjusting the second time range by dragging a scroll bar along a bottom of the control area.

6. The method of claim 1, wherein the repeating further comprises automatically re-sorting the view of projects running during the at least one activity timeline and removing any unnecessary gaps between projects.

7. A computer program, stored in a non-transitory medium, for representing a project in a web application, the program comprising instructions to cause a processor to:
   generate a graphic display of a project comprising a plurality of projects in the form of a Gantt chart in a browser by displaying a vertical list in the Gantt chart comprising at least a portion of the plurality of projects, and displaying at least one activity timeline reflecting activity for each of the projects in the vertical list of projects and presenting the at least one activity timeline horizontally across a viewable area of the Gantt chart;
   display a control area in the browser providing a graph showing a high level view of activity associated with the plurality of projects during a second time range greater than a first time range, the graph showing the high level view of activity plotting a number of the plurality of projects running as a function of time;
   provide at least one date range control in the control area in the form of a scrollable view bar overlapping the graph, the scrollable view bar having manipulable edges and a view window configured for visually indicating a portion of the high level view of activity in the graph associated with the first time range; and
   responsive to manipulation of at least one of the manipulable edges of scrollable view bar by a user, adjust the first time range and repeating the generation of the graphic display and the display of the control area based on the adjusted first time range.

8. A system for representing a timeline for a plurality of projects, the method comprising:
   a processor;
   a first module controlling the processor for generating a graphic display in the form of a Gantt chart in a browser, the generating comprising displaying a vertical list of projects in the Gantt chart comprising at least a portion of the plurality of projects running during a first time range, and displaying at least one activity timeline reflecting activity for each of the projects in the vertical list of projects during the first time range and presenting the at least one activity timeline horizontally across a viewable area of the Gantt chart;
   a second module controlling the processor for displaying a control area in the browser providing a graph showing a high level view of activity associated with the plurality of projects during a second time range greater than the first time range, and for providing at least one date range control in the control area in the form of a scrollable view bar overlapping the graph, the scrollable view bar having manipulable edges and a view window configured for visually indicating a portion of the high level view of activity in the graph associated with the first time range, the graph showing the high level view of activity plotting a number of the plurality of projects running as a function of time; and
   a third module controlling the processor for adjusting the first time range responsive to a manipulation of at least one of the manipulable edges of scrollable view bar and causing an adjustment of the graphic display and the control area based on the adjusted first time range.

9. The system of claim 8, further comprising a fourth module controlling the processor for enabling a dynamic set of controls with filtered views of the Gantt chart providing preset time frames including days, weeks, months and years or predetermined date ranges entered by a user.

10. The system of claim 9, wherein the first module is further configured to cause the processor to automatically re-sort and scale content on the Gantt chart into the viewable area to reduce scrolling in accordance with the filtered view that is set.

11. The method of claim 8, further comprising a fourth module controlling the processor for adjusting the second time range responsive to a user dragging a scroll bar along a bottom of the control area.

12. The method of claim 8, wherein the adjustment of the graphic display and the control area further comprises automatically re-sorting the view of projects running during the selected timeline and removing any unnecessary gaps between projects.

* * * * *